UNITED STATES PATENT OFFICE.

ROBERT G. VASSAR, OF POUGHKEEPSIE, NEW YORK.

IMPROVED BLUING-PASTE.

Specification forming part of Letters Patent No. 46,160, dated January 31, 1865.

*To all whom it may concern:*

Be it known that I, ROBERT G. VASSAR, of the city of Poughkeepsie, county of Dutchess, and State of New York, have invented a new and Improved Bluing-Paste; and I do hereby claim that the following is a full and exact description thereof.

Take four (4) pounds of bicarbonate of soda, four (4) pounds of indigo-paste, and two (2) ounces of acetic acid. Sift the bicarbonate of soda and mix gradually with the indigo-paste. Let it stand twenty-four hours; then stir in the acetic acid. This forms a liquid which should be poured in layers of from one-eighth to one-half of an inch in thickness and allowed to stand exposed to the air for forty-eight hours, when it will become a thick paste. Then put this paste in earthen boxes and leave exposed to the sun for the space of twelve hours, and it will become hardened.

What I claim as my invention, and desire to secure by Letters Patent, is—

The peculiar combination of the above ingredients, forming a more economical and perfect bluing than any now in use.

ROBERT G. VASSAR.

Witnesses:
JAMES A. LEONARD,
R. H. FREEMAN.